United States Patent
Grimm et al.

(10) Patent No.: US 11,453,609 B2
(45) Date of Patent: Sep. 27, 2022

(54) METHOD FOR PRODUCING A GLASS ARTICLE

(71) Applicant: Schott AG, Mainz (DE)

(72) Inventors: Malte Grimm, Mitterteich (DE); Christof Kass, Tirschenreuth (DE); Peter Nass, Mainz (DE)

(73) Assignee: Schott AG, Mainz (DE)

( * ) Notice: Subject to any disclaimer, the term of this patent is extended or adjusted under 35 U.S.C. 154(b) by 432 days.

(21) Appl. No.: 16/379,025

(22) Filed: Apr. 9, 2019

(65) Prior Publication Data

US 2019/0308902 A1 Oct. 10, 2019

(30) Foreign Application Priority Data

Apr. 9, 2018 (DE) .................... 10 2018 205 257.3

(51) Int. Cl.
| | | |
|---|---|---|
| *C03C 3/093* | (2006.01) | |
| *A61J 1/14* | (2006.01) | |
| *A61J 1/06* | (2006.01) | |
| *C03B 23/09* | (2006.01) | |
| *C03B 25/02* | (2006.01) | |
| *C03C 3/078* | (2006.01) | |
| *C03C 3/083* | (2006.01) | |
| *C03C 3/085* | (2006.01) | |
| *C03C 3/089* | (2006.01) | |
| *C03C 3/091* | (2006.01) | |
| *C03C 4/20* | (2006.01) | |
| *C03C 3/11* | (2006.01) | |

(52) U.S. Cl.
CPC ............. *C03C 3/093* (2013.01); *A61J 1/065* (2013.01); *A61J 1/1468* (2015.05); *C03B 23/09* (2013.01); *C03B 25/02* (2013.01); *C03C 3/078* (2013.01); *C03C 3/083* (2013.01); *C03C 3/085* (2013.01); *C03C 3/089* (2013.01); *C03C 3/091* (2013.01); *C03C 3/11* (2013.01); *C03C 4/20* (2013.01); *C03C 2203/52* (2013.01)

(58) Field of Classification Search
CPC ......... C03C 3/093; C03C 3/085; C03C 3/089; C03C 4/20; C03C 2203/52; A61J 1/1468
See application file for complete search history.

(56) References Cited

U.S. PATENT DOCUMENTS

| | | | | |
|---|---|---|---|---|
| 7,144,835 | B2 * | 12/2006 | Kass | ......................... C03C 8/24 |
| | | | | 501/65 |
| 9,643,882 | B2 | 5/2017 | Tratzky et al. | |
| 10,570,052 | B2 * | 2/2020 | Kass | ......................... A61J 1/06 |
| 10,669,196 | B2 | 6/2020 | Gaylo et al. | |
| 10,710,925 | B2 | 7/2020 | Kimura et al. | |
| 2004/0113237 | A1 | 6/2004 | Kass et al. | |
| 2006/0120105 | A1 | 6/2006 | Fechner et al. | |
| 2014/0034544 | A1 * | 2/2014 | Chang | .................. B65D 1/0207 |
| | | | | 206/524.3 |
| 2014/0151371 | A1 * | 6/2014 | Chang | .................. C09D 179/08 |
| | | | | 220/62.15 |
| 2018/0022161 | A1 | 1/2018 | Hye | |

FOREIGN PATENT DOCUMENTS

| | | |
|---|---|---|
| DE | 103 37 362 A1 | 3/2004 |
| DE | 10 2016 005 820 U1 | 1/2017 |
| DE | 10 2016 218 244 B3 | 8/2017 |

OTHER PUBLICATIONS

Chinese Office Action dated Jun. 2, 2021 for Chinese Patent Application No. 201910281732.5 (10 pages).
European Search Report dated Sep. 6, 2019 for European Patent Application No. 19 16 6518 (4 pages).
Glassware—Hydrolytic resistance of the interior surfaces of glass containers—Part 2 Determination by flame spectrometry and classification, DIN ISO 4802-2:2016 (20 pages).
The United States Pharmacopeia and The National Formulary, United States Pharmacopeial Convention Prepared by the Council of Experts and Expert Committees, ISO 660, May 1, 2017 (8 pages).

* cited by examiner

*Primary Examiner* — Noah S Wiese
(74) *Attorney, Agent, or Firm* — Taylor IP, P.C.

(57) ABSTRACT

A method for producing a glass article having high hydrolytic resistance is provided. A glass tube consisting of borosilicate glass and having an $Al_2O_3$ content of less than 1 weight-%, a $ZrO_2$ content of 2-12 weight-%, and a glass transition temperature $T_g$ is reshaped into a glass article and is subsequently subjected to a thermal post-treatment. To reduce the alkali release of the glass article, the glass article is subjected to a treatment temperature of $T_B \geq T_g + 5°$ K over a treatment time of $t_B \geq 5$ min and is subsequently cooled during the thermal post-treatment.

15 Claims, No Drawings

METHOD FOR PRODUCING A GLASS ARTICLE

BACKGROUND OF THE INVENTION

1. Field of the Invention

The current invention relates to a method for producing a glass article having high hydrolytic resistance. It further relates to a glass article produced in such a method, as well as to the utilization of a glass article produced by the method.

2. Description of the Related Art

Glass articles, for example glass vials can be produced from a multitude of glass types. The current invention relates to borosilicate glasses whose eponymous elements are diboron trioxide ($B_2O_3$) and silicon dioxide ($SiO_2$). Borosilicate glasses are, in particular, glasses having an $SiO_2$ content of between 60 and 80 weight-% as well as having a $B_2O_3$ content of between 5 and 20 weight-%.

Borosilicate glasses are characterized by very high temperature and chemical stability (including water). This results in high hydrolytic resistance which is generally understood to be a modest alkali release, in other words a modest release of alkaline earth oxides and alkaline oxides (in particular $Li_2O$, $Na_2O$, $K_2O$, MgO, CaO, BaO, SrO) into the environment. Based on their modest alkali release, borosilicate glasses are generally classified as glasses within hydrolytic category 1 (also: Type 1) according to ISO 719 or, respectively, ISO 720.

The alkali release of a glass or glass article can be determined by standards DIN ISO 4802-2:2017 (for short: ISO 4802) and USP 660 (glass grains) or ISO 720 (glass grains). In the method according to ISO 4802 a glass container, or respectively a tube, section that is intended for the production of containers which is to be tested is filled with distilled water and is subjected for 60+1 min. in an autoclave to a temperature of 121+1° C. and subsequently cooled in a controlled manner, as a result of which a so-called extraction solution (also referred to as eluate) is created. The extraction solution can be examined by flame atomic absorption spectroscopy (F-AAS) as to the contained amount of alkaline metals and alkaline earth metals, whereby a so-called $Na_2O$ equivalency (unit mg/l, milligram per liter) is determined.

In a method according to USP 660 (glass grains) or ISO 720 (glass grains) glass is pounded or ground into glass grains by a nominated mortar. Both methods are to be considered as equivalent. Subsequently, 10.0 g glass grains are heated together with demineralized water in an autoclave to 121+1° C. and are subsequently cooled in a controlled manner. According to standard norms, methyl red is added into the thus treated fluid (also referred to as eluate). The liquid is subsequently titrated with hydrochloric acid and compared with a control liquid without glass grains. From the titrated volume the alkali release from the glass grains is ultimately calculated, which can also be specified as $Na_2O$-equivalency in mg/l. Since the titration according to standard norms only provides a sum value of the alkaline metals and alkaline earth metals, the individual values of the alkaline metals and alkaline earth metals are determined in a departure from the norm with the assistance of F-AAS (unit mg/l, milligram per liter).

A comparability between two values of the two different measurement methods (ISO 4802 and USP 660 or ISO 720) is however not given. Only values can be compared with each other that were determined on the basis of the same measurement method. ISO 4802 describes the resistance of the surface of the manufactured container or, in conformity with ISO 4802 the surface of a tube section that is to be reshaped into a container, whereas USP 660 or ISO 720 examines glass grains and thus determines the material-intrinsic resistance of the glass which is independent of the influences related to processing.

In addition to multiple other uses—as described for example in U.S. Patent Application Publication No. 2006/0120105 A1, as a vitreous body for a light bulb—glass articles produced from borosilicate glasses are used also for storage of drugs and other pharmaceutical substances due to the high hydrolytic resistance and the high chemical stability. In many borosilicate glasses, a high $Al_2O_3$ content of, for example, 2 to 7 weight-% is responsible for the high chemical stability. However, as already described in DE 103 37 362 A1 and DE 10 2016 218 244 B3, the use of aluminum in glasses for pharmaceutical applications is undesirable because the aluminum can migrate from the glass into the pharmaceutical substance and subsequently into the human body where it can possibly lead to health issues.

It was therefore the objective of DE 103 37 362 A1 and DE 10 2016 218 244 B3 to provide a borosilicate glass without aluminum which would meet the demands that are generally placed on borosilicate glasses. Since the alkali release—in particular for application in the pharmaceutical industry—cannot be low enough, there is a continued interest to develop aluminum-free borosilicate glasses with even lower alkali release.

What is needed in the art is borosilicate glass articles with reduced alkali release.

SUMMARY OF THE INVENTION

Exemplary embodiments disclosed herein provide a method for producing a glass article having a high hydrolytic resistance. A glass tube consisting of borosilicate glass and having an $Al_2O_3$ content of less than 1 weight-%, such as less than 0.2 weight-%, and a $ZrO_2$ content of 2-12 weight-% and with a glass transition temperature $T_g$ is first reshaped into a glass article and is subsequently subjected to a thermal post-treatment. During reshaping, the tube is always heated to a molten condition which is several hundred degrees Celsius above $T_g$. The reshaping temperature is, for example, around 1500-1600° C. During the thermal post-treatment, the glass article is subjected over a treatment time of $t_B \geq 5$ min to a treatment temperature of $T_B \geq T_g+5$ K and is subsequently cooled.

At the end of the thermal post-treatment, the glass article is annealed. Annealing starts, for example, at $T_g+30K$ with a cooling rate of 2K/min and ends at $T_g-30K$. All other cooling rates are optional, in particular the cooling rate up to $T_g+30K$ and that from $T_g-30K$ to ambient temperature.

The thermal post-treatment can occur within the scope of the glass article production. Thermal post-treatment including annealing can occur in one single furnace, such as an in-line furnace. Reshaped glass containers therefore can undergo thermal post-treatment after reshaping and are annealed at the conclusion of said post-treatment.

Annealing can alternatively also be performed in a process separate from thermal post-treatment. After being maintained at $T_g$, the glass article can, for example, be cooled in an uncontrolled manner, in particular to RT. Annealing can afterwards occur at any time.

From the current state of the art, only heat treatments are known for glass article for stress reduction. The formed glass article was herein subjected for example for a few seconds to a temperature of $T_g+30°$ C. It was surprisingly concluded that with the inventive thermal post-treatment an improvement of the hydrolytic resistance, i.e. a lower alkali release and a lower aluminum release, can be achieved. The reason for the reduced alkali release from the glass article following the inventive thermal post-treatment is hitherto unknown. It could, however, be determined that the reduction in the alkali release in borosilicate glasses occurs only if the glass—aside from unavoidable contaminants—has an $Al_2O_3$ content of less than 1 weight-% and a $ZrO_2$ content of 2-12 weight-%, such as 2-11 weight-%, 2-10 weight-%, or 2-9 weight-%. High melting temperatures are required above 12 weight-% and the molten glass becomes more viscous, thus making the production process costlier and more energy intensive and thereby rendering it uneconomical. $ZrO_2$ itself is an expensive raw material, so that more than 9 weight-% is considered increasingly uneconomical and more than 12 weight-% in the glass is considered completely uneconomical.

As described, the borosilicate glass provided according to the invention has an $Al_2O_3$ content of less than 1 weight-%, such as less than 0.2 weight-%. An aluminum-free borosilicate glass may even be used, because the aluminum can migrate from the glass when used in pharmaceutical glass articles into the human body where it can lead to health issues. As used herein, "aluminum free" relates to a glass whose $Al_2O_3$ content is <0.1 weight-%.

After reshaping and prior to the thermal post-treatment, the glass article can be cooled to a temperature below the glass transition temperature $T_g$ and to ambient temperature $T_R=20\pm5°$ C. The glass article is then subsequently again heated from ambient temperature $T_R=20\pm5°$ C. to processing temperature $T_B$. Final cooling may occur again to ambient temperature $T_R$. In this way, the thermal post-treatment can occur at any time after reshaping. Intermediate cooling to $T_R$ can occur since the treatment times increase due to the thermal post-treatment. In particular, only reshaping can occur in a first converter and the thermal post-treatment can be performed in a second converter. The two converters are separated from one another spatially and the two processes are separated from one another chronologically.

Whereas intermediate cooling to ambient temperature provides advantages in terms of flexibility of the method, it is advantageous in regard to economic efficiency of the method not to cool the glass article to room temperature following reshaping, since a subsequent repeated heating within the scope of the inventive thermal post-treatment requires additional energy consumption. To improve the economic efficiency, the glass article is therefore directed after reshaping to the thermal post-treatment without intermediate storage.

Before the thermal post-treatment, the glass article can thus have a temperature above or below $T_B$ or, in exceptional cases equal to $T_B$. If the glass article after reshaping still has a temperature above $T_B$, it is first cooled down to $T_B$ and is subsequently maintained to $T_B$. If, after reshaping the glass article was cooled at a maximum to $T_R$, then it has a temperature below $T_B$ prior to the thermal post-treatment. The glass article is then initially heated before start of the thermal post-treatment. Subsequently, it is maintained at $T_B$. If the glass article already has a temperature equal to $T_B$, the process to maintain can be implemented immediately.

The effect of the thermal post-treatment according to the invention can be improved by increasing the treatment temperature $T_B$ as well as by extending the treatment time $t_B$. Thus, the treatment temperature may be $T_B \geq T_g+15$ K, such as $T_B \geq T_g+30$ K or $T_B \geq T_g+50$ K. The treatment time may be $t_B \geq 15$ min, such as $t_B \geq 30$ min, $t_B \geq 60$ min, or $t_B \geq 120$ min. An improvement in the hydrolytic resistance occurs with the increase of the treatment temperature as well as with the increase in the treatment time.

The glass tube may be produced in the Danner-method, Vello-method or A-draw- or Down draw method. The glass tube is subsequently reshaped to a container or glass article.

A borosilicate glass of the following composition may be used:

| | |
|---|---|
| $SiO_2$ | 60-78 weight -% |
| $B_2O_3$ | 7-20 weight -% |
| $Li_2O$ | 0-2 weight -% |
| $Na_2O$ | 0-6.5 weight -% |
| $K_2O$ | 2.5-12 weight -% |
| ZnO | 0-2 weight -% |
| $ZrO_2$ | 2-12 weight -% |
| refining agent | 0-1 weight -% |
| $Al_2O_3$ | <1 weight -% |
| optionally one or several of components MgO, CaO, BaO, $TiO_2$, SrO with a total of <2 weight -% and unavoidable contaminants. | |

In addition to the above referenced components of the borosilicate glass composition, it is essentially possible to add additional components to the borosilicate glass if the additional components do not have a negative effect upon the inventive characteristics of the produced glass article, in particular its hydrolytic resistance. In some embodiments, the borosilicate glass consists exclusively of the components listed in the above specified composition.

Refining agents that can be added individually or in combination to the glass melt are halides (especially fluoride and chlorine), cerium oxide, iron oxide, antimony oxide, arsenic oxide and tin oxide which are detectable within the above cited contents in the end product. Optionally, MgO, CaO, BaO, SrO, $TiO_2$ and unavoidable contaminants are measurable in the above specified amounts in the end product.

Halides, that is in particular fluorine and chlorine, are especially effective refining agents. If fluorine and chlorine are used in refining, a small amount is already sufficient. The fluorine and chlorine content of the composition may then be 0-0.2 weight-%, especially if fluorine and chlorine are the only refining agents used.

In the case of $Al_2O_3$, an amount of less than 1 weight-% is acceptable, since even at such shares only small amounts of aluminum migrate into a fluid that is in contact with the glass. However, the glass may be aluminum-free. As used herein, a glass is considered "aluminum-free" if it contains less than 0.1 weight-% of $Al_2O_3$.

Unavoidable contaminants are considered to be, in particular, substances with content of respectively $\leq 0.2$ weight-%.

The borosilicate glass may have a glass transition temperature 500° C.$\leq T_g \leq$620° C. At the glass transition temperature $T_g$, the glass generally has a viscosity ($\eta$), whereby the following applies:

$$12\ Pa \cdot s \leq \lg(\eta) \leq 13\ Pa \cdot s.$$

To avoid the glass article deforming due to the thermal post-treatment, the glass article may be subjected to a treatment temperature $T_B \leq T_g+100$ K. Thus, the glass article displays sufficient stability during the thermal post-treatment, so that deformation can largely be prevented.

In some embodiments, the glass article is subjected to a treatment time of $t_B \geq 5$ min at a treatment temperature $T_B \geq T_g + 5$ K and is subsequently cooled—the last treatment step under heat influence (greater ambient temperature $T_R$) of the method for producing a glass article having high hydrolytic resistance.

The thermal post-treatment according to the invention is essentially associated with additional energy expenditure. To limit said energy expenditure and thus to maintain the economic efficiency of the method according to the invention, the glass article may be subjected to temperature $T_B$ over a treatment time $t_B \leq 360$ m.

Maintaining the glass article during the treatment time $t_B$ at the treatment temperature $T_B$ is of particular significance. The management of heating or cooling of the glass article requires additional measures and equipment which would increase the complexity of the method according to the invention and lower the economic efficiency. In some embodiments, the glass article is arranged at the start of the thermal post-treatment in a furnace which is set to the operating temperature $T_B$, thus eliminating additional controls. Especially useful is the combination of the thermal post-treatment (as described above) in a furnace, together with the generally downstream annealing for reduction of tensions in the glass container (in-line process) which were created in the glass container by reshaping.

A glass article which is produced according to the method described above is also provided according to the present disclosure.

In some exemplary embodiments, a glass article is provided that has a high hydrolytic resistance and consisting of—aside from unavoidable contaminants—aluminum-free borosilicate glass having a $ZrO_2$ content of 2-12 weight-% with an alkali release of $A \leq 0.5$ mg/l $Na_2O$ equivalency according to ISO 4802 or an alkali release $A \leq 3$ mg/l $Na_2O$ equivalency according to USP 660 (glass grains). The glass article may be produced according to the method described above.

The glass article may be in the embodiment of a small glass bottle, a glass vial, an ampoule, in particular a glass ampoule or a cylindrical ampoule, a cartridge, a syringe body, a rod, an internal and/or external constructed tubular object or tube or a semi-finished product to produce one of the aforementioned articles or glass grains produced according to USP 660.

In some embodiments, the glass article demonstrates an alkali release A that is $\geq 15\%$, such as $\geq 40\%$ or $\geq 50\%$ less compared to an untreated reference glass article of the same composition.

Likewise, a reduction of the respective alkali releases of $\geq 15\%$, such as $\geq 40\%$ or $\geq 50\%$ can be achieved with the previously described method in regard of individual alkali oxides or alkaline earth oxides. The glass article disclosed herein therefore shows such a reduction in regard of at least one alkali oxide or alkaline earth oxide. The alkali release may be determined according to ISO 4802-2 or USP 660 (glass grains) or ISO 720 (glass grains). In this context "untreated" means that the reference article was not subjected to the disclosed thermal post-treatment. Likewise, a use of the inventive glass article in the medical industry, in particular through use as storage containers for chemical products which are used in measuring devices or equipment in the medical industry, is also provided. In addition to the low alkali release, the low aluminum content in the glass article is also advantageous here.

A borosilicate glass of the following composition may be used:

| | |
|---|---|
| $SiO_2$ | 60-78 weight -% |
| $B_2O_3$ | 7-20 weight -% |
| $Li_2O$ | 0-2 weight -% |
| $Na_2O$ | 0-6.5 weight -% |
| $K_2O$ | 2.5-12 weight -% |
| ZnO | 0-2 weight -% |
| $ZrO_2$ | 2-12 weight -% |
| refining agent | 0-1 weight -% |
| $Al_2O_3$ | <1 weight -% |
| optionally one or several of components MgO, CaO, BaO, $TiO_2$, SrO with a total of <2 weight -% and unavoidable contaminants. | |

In this regard too, additional components are basically not excluded, if the additional components do not have a negative effect upon the inventive characteristics of the produced glass article, in particular its hydrolytic resistance. In some embodiments, the borosilicate glass consists exclusively of the components listed in the above specified composition.

A use of the above described glass article as storage for pharmaceutical substances, which can also be obtained by an end user, is also provided according to the present disclosure.

Likewise, a use of the inventive glass article in the medical industry, in particular through use as storage containers for chemical products which are used in measuring devices or equipment in the medical industry, is also provided. In addition to the low alkali release, the low aluminum content in the glass article is also advantageous here.

DETAILED DESCRIPTION OF THE INVENTION

Exemplary embodiments provided according to the present disclosure are described further herein.

TABLE 1

| | Factor | A1 | A2 | A3 | A4 | A5 |
|---|---|---|---|---|---|---|
| $SiO_2$ [weight-%] | | 72.75 | 69.17 | 73.33 | 70.77 | 76.16 |
| $B_2O_3$ [weight-%] | | 10.12 | 9.12 | 10.12 | 16.52 | 12.42 |
| $Al_2O_3$ [weight-%] | | 0.15 | 0.18 | 0.08 | 0.11 | |
| $Li_2O$ [weight-%] | | | 0.39 | | 0.67 | 0.3 |
| $Na_2O$ [weight-%] | | 2.8 | 2.02 | 2.86 | 0.99 | 0.71 |
| $K_2O$ [weight-%] | | 6.21 | 10.32 | 6.1 | 7.19 | 4.65 |
| MgO [weight-%] | | | | | | |
| CaO [weight-%] | | | | | | |
| BaO [weight-%] | | | | | | |

TABLE 1-continued

|  | Factor | A1 | A2 | A3 | A4 | A5 |
|---|---|---|---|---|---|---|
| ZnO [weight-%] |  |  |  |  | 0.82 |  |
| $ZrO_2$ [weight-%] |  | 7.89 | 8.7 | 7.43 | 2.79 | 5.76 |
| F [weight-%] |  |  |  |  |  |  |
| Cl [weight-%] |  | 0.08 | 0.1 | 0.08 | 0.14 |  |
| Sum total [weight-%] |  | 100 | 100 | 100 | 100 | 100 |
| CTE [$10^{-6}$/K] |  | 4.7 | 5.3 | 4.7 | 5.1 | n.d. |
| $T_g$ [° C.] |  | 585 | 560 | 585 | 505 | 530 |
| Ew [° C.] |  | n.d | n.d | 785 | 725 | n.d. |
| VA [° C.] |  | 1215 | 1180 | 1210 | 1060 | n.d. |
| First measurement $Li_2O$ [mg/l] | 2.07 |  | 0.32 |  | 5.87 | 0.37 |
| $Na_2O$ [mg/l] | 1 | 0.33 | 1.71 | 2.57 | 8 | 0.85 |
| $K_2O$ [mg/l] | 0.66 | 0.41 | 5.65 | 3 | 43 | 2.55 |
| MgO [mg/l] | 1.54 |  |  |  |  |  |
| CaO [mg/l] | 1.11 |  |  |  |  |  |
| BaO [mg/l] | 0.41 |  |  |  |  |  |
| USP660 (glass grains), $Na_2O$ equiv. [mg/l] |  | — | 6.1 | 4.5 | 48.5 | 3.3 |
| ISO4802-2 (tube), $Na_2O$ equiv. [mg/l] |  | 0.6 | — | — | — | — |
| Base level untreated [%] |  | 100% | 100% | 100% | 100% | 100% |
| Treatment temperature $T_B$ [° C.] |  | 610 | 590 | 630 | 555 | 580 |
| $T_B - T_g$ [K] |  | 25 | 30 | 45 | 50 | 50 |
| Treatment time $t_B$ [min] |  | 360 | 30 | 15 | 30 | 30 |
| Second measurement $Li_2O$ [mg/l] | 2.07 |  | 0.27 |  | 4.84 | 0.17 |
| $Na_2O$ [mg/l] | 1 | 0.19 | 1.45 | 1.4 | 6.4 | 0.47 |
| $K_2O$ [mg/l] | 0.66 | 0.16 | 4.15 | 1.36 | 40.3 | 1.79 |
| MgO [mg/l] | 1.54 |  |  |  |  |  |
| CaO [mg/l] | 1.11 |  |  |  |  |  |
| BaO [mg/l] | 0.41 |  |  |  |  |  |
| USP660 (glass grains), $Na_2O$ equiv. [mg/l] |  | — | 4.7 | 2.3 | 43 | 2 |
| ISO4802-2 (tube), $Na_2O$ equiv. [mg/l] |  | 0.3 | — | — | — | — |
| Level after thermal treatment [%] |  | 49% | 78% | 51% | 89% | 61% |

TABLE 2

|  | Factor | V1 | V2 | V3 | V4 | V5 |
|---|---|---|---|---|---|---|
| $SiO_2$ [weight-%] |  | 75.2 | 73 | 75.5 | 60.9 | 75.5 |
| $B_2O_3$ [weight-%] |  | 10.4 | 11 | 16.1 | 0.5 | 16.5 |
| $Al_2O_3$ [weight-%] |  | 5.5 | 7 |  | 16.5 | 1.5 |
| $Li_2O$ [weight-%] |  |  |  | 0.1 |  |  |
| $Na_2O$ [weight-%] |  | 7.2 | 7 | 0.5 |  | 4 |
| $K_2O$ [weight-%] |  |  | 1 | 5.1 |  | 1.5 |
| MgO [weight-%] |  |  |  |  |  | 0.5 |
| CaO [weight-%] |  | 1.5 | 1 | 0.9 | 13.1 | 0.5 |
| BaO [weight-%] |  |  |  | 0.6 | 8 |  |
| ZnO [weight-%] |  |  |  |  |  |  |
| $ZrO_2$ [weight-%] |  |  |  | 1 | 1 |  |
| F [weight-%] |  | 0.2 |  |  |  |  |
| Cl [weight-%] |  |  |  | 0.2 |  |  |
| Sum total [weight-%] |  | 100 | 100 | 100 | 100 | 100 |
| CTE [$10^{-6}$/K] |  | 4.9 | 5.2 | 4 | 4.7 | 3.9 |
| $T_g$ [° C.] |  | 560 | 555 | 535 | 790 | 525 |
| Ew [° C.] |  | 785 | 785 | 785 | 1005 | 775 |
| VA [° C.] |  | 1160 | 1170 | 1155 | 1305 | 1135 |
| First measurement $Li_2O$ [mg/l] | 2.07 |  |  | 2.53 |  |  |
| $Na_2O$ [mg/l] | 1 | 0.57 | 0.45 | 6.3 | 0.03 | 41.5 |
| $K_2O$ [mg/l] | 0.66 |  | n.d. | 7.2 |  | 11.9 |
| MgO [mg/l] | 1.54 |  |  |  |  | 0.56 |
| CaO [mg/l] | 1.11 |  | n.d. | 1.94 | 1.51 | 0.65 |
| BaO [mg/l] | 0.41 |  |  | <0.50 | n.d |  |
| USP660 (glass grains), $Na_2O$ equiv. [mg/l] |  | — | — | 61.3 | — | 50.9 |
| ISO4802-2 (tube), $Na_2O$ equiv. [mg/l] |  | 0.6 | 0.5 | — | 1.7 | — |
| Base level untreated [%] |  | 100% | 100% | 100% | 100% | 100% |
| Treatment temperature $T_B$ [° C.] |  | 600 | 580 | 585 | 825 | 555 |
| $T_B - T_g$ [K] |  | 40 | 25 | 50 | 35 | 30 |
| Treatment time $t_B$ [min] |  | 10 | 5 | 30 | 32 | 30 |
| Second measurement $Li_2O$ [mg/l] | 2.07 |  |  | 2.58 |  |  |
| $Na_2O$ [mg/l] | 1 | 0.73 | 0.7 | 6.9 | 0.05 | 44.6 |
| $K_2O$ [mg/l] | 0.66 |  | n.d. | 91 |  | 12.5 |
| MgO [mg/l] | 1.54 |  |  |  |  | 0.63 |
| CaO [mg/l] | 1.11 |  | n.d. | 2.48 | 1.88 | 0.58 |
| BaO [mg/l] | 0.41 |  |  | <0.50 | n.d |  |
| USP660 (glass grains), $Na_2O$ equiv. [mg/l] |  | — | — | 75.1 | — | 54.4 |

TABLE 2-continued

| Factor | V1 | V2 | V3 | V4 | V5 |
|---|---|---|---|---|---|
| ISO4802-2 (tube), Na$_2$O equiv. [mg/l] | 0.7 | 0.7 | — | 2.13 | — |
| Level after thermal treatment [%] | 128% | 156% | 123% | 125% | 107% |

In Table 1, examples (A1 to A5) provided according to the invention are outlined and Table 2 outlines non-inventive comparative examples (V1 to V5). The glass composition is specified for each example. In addition, Tables 1 and 2 include four parameters: coefficient of thermal expansion (CTE), glass transition temperature ($T_g$), softening point (Ew), as well as processing temperature (VA). "n.d." in the tables indicates "not determined".

Aside from unavoidable contaminants, the glass compositions in examples A1 to A5 include no Al$_2$O$_3$. Thus, all examples are aluminum-free borosilicate glass. The glasses in comparison examples V1, V2 are also borosilicate glasses, however, they are not aluminum-free. The glass in comparison example V4 is an aluminosilicate glass. This glass has an Al$_2$O$_3$ content of 16.5 weight-% and a ZrO$_2$ content of 1 weight-%. This example shows that the presence of a low amount of ZrO$_2$ does not result in an improvement of the alkali release following a thermal post-treatment.

Two measurements of the alkali release are obtained for each of the examples in Tables 1 and 2. A first measurement was performed on a reference article without thermal post-treatment; the second measurement was performed on an article that was thermally post-treated according to the method disclosed herein. The measurements were performed either according to USP 660 (glass grains) or ISO 720 (glass grains) or according to ISO 4802, whereby in each instance the Na$_2$O equivalency is stated. In comparison examples V2 and V4, only the release of selected oxides was determined.

For the calculation of the Na$_2$O equivalency, factors for the alkali oxides or alkaline earth oxides Li$_2$O, Na$_2$O, K$_2$O, MgO, CaO and BaO are specified in Tables 1 and 2. The factors determine the weighting of the individual components for calculation of the Na$_2$O equivalency. The factors are determined by the molar ratio between Na$_2$O and the corresponding oxide (i.e. for K$_2$O: M(Na$_2$O)/M(K$_2$O)= [61.979/(2*39.098+15.999)]=0.658). This factor also arises from DIN ISO 4802-2:2017. When calculating the Na$_2$O equivalency, each measured value for the six components is multiplied with the associated factor and the thus obtained values are then totaled.

In addition, the treatment time $t_B$, the treatment temperature $T_B$, as well as the difference $T_B$-$T_g$ are specified. The treatment time $t_B$ in examples A1 to A5 is between 15 and 360 minutes. The treatment times $t_B$ in the comparative examples are between 5 and 32 minutes. The difference $T_B$-$T_g$ was between 25 and 50 K in the examples A1 to A5 as well as in the comparative examples V1 to V5.

Examples A1 to A5 indicate a clear reduction of the alkali release of up to 49% of the reference value of the untreated base glass, as a result of the inventive method. In contrast, the inventive thermal post-treatment in comparative examples V1 to V5 results even in an increase in the alkali release of up to 156% of the reference value. This is associated with the non-content or too small a content of ZrO$_2$.

The influence of the ZrO$_2$ content upon the efficiency of the inventive method is visible especially in comparison example V3. The glass in this test is aluminum-free, however the ZrO$_2$ content is only 1 weight-% and thus outside the inventive range. The measurement of the alkali release shows that, in this comparative example, the alkali release increases through the thermal post-treatment provided according to the invention. The aluminum-free glasses in examples A1 to A5 in Table 1 have a respective ZrO$_2$ content of between 2 and 12 weight-% and the alkali release drops based on the thermal post-treatment provided according to the invention.

TABLE 3

| Test row | | OD in mm | WT in mm | Type | $T_B$ in °C. | $T_B$—$T_g$ in K | $t_B$ in min | Na$_2$O equival. in mg/l | Level alkali release |
|---|---|---|---|---|---|---|---|---|---|
| VR1 | a | 14.25 | 0.95 | tube | — | — | — | 0.59 | 100% |
| | b | 14.25 | 0.95 | tube | 610 | 25 | 360 | 0.3 | 50% |
| VR2 | a | 16 | 1 | tube | — | — | — | 0.67 | 100% |
| | b | 16 | 1 | tube | 590 | 5 | 5 | 0.42 | 63% |
| | c | 16 | 1 | tube | 590 | 5 | 15 | 0.37 | 56% |
| | d | 16 | 1 | tube | 590 | 5 | 30 | 0.32 | 47% |
| | e | 16 | 1 | tube | 590 | 5 | 120 | 0.3 | 44% |
| | f | 16 | 1 | tube | 590 | 5 | 360 | 0.28 | 41% |
| VR3 | a | 16 | 1 | tube | — | — | — | 0.61 | 100% |
| | b | 16 | 1 | tube | 610 | 25 | 5 | 0.41 | 67% |
| | c | 16 | 1 | tube | 610 | 25 | 15 | 0.38 | 62% |
| | d | 16 | 1 | tube | 610 | 25 | 30 | 0.3 | 50% |
| | e | 16 | 1 | tube | 610 | 25 | 120 | 0.31 | 50% |
| | f | 16 | 1 | tube | 610 | 25 | 360 | 0.31 | 50% |
| VR4 | a | 16 | 1 | tube | — | — | — | 0.6 | 100% |
| | b | 16 | 1 | tube | 630 | 45 | 5 | 0.32 | 53% |
| | c | 16 | 1 | tube | 630 | 45 | 15 | 0.32 | 53% |
| | d | 16 | 1 | tube | 630 | 45 | 30 | 0.3 | 49% |
| | e | 16 | 1 | tube | 630 | 45 | 120 | 0.27 | 45% |
| | f | 16 | 1 | tube | 630 | 45 | 360 | 0.25 | 41% |
| VR5 | a | 8.65 | 0.9 | tube | — | — | — | 1.29 | 100% |
| | b | 8.65 | 0.9 | tube | 600 | 15 | 45 | 0.91 | 71% |
| | c | 8.65 | 0.9 | tube | 650 | 65 | 30 | 0.71 | 55% |

TABLE 3-continued

| Test row | | OD in mm | WT in mm | Type | $T_B$ in °C. | $T_B-T_g$ in K | $t_B$ in min | Na$_2$O equival. in mg/l | Level alkali release |
|---|---|---|---|---|---|---|---|---|---|
| VR6 | a | 16 | 1 | tube | — | — | — | 0.63 | 100% |
| | b | 16 | 1 | tube | 685 | 100 | 60 | 0.25 | 39% |
| | c | 16 | 1 | tube | 685 | 100 | 60 | 0.29 | 47% |
| VR7 | a | 16 | 1 | glass grains | — | — | — | 4.54 | 100% |
| | b | 16 | 1 | glass grains | 630 | 45 | 15 | 2.29 | 51% |
| | c | 16 | 1 | glass grains | 610 | 25 | 60 | 3.8 | 84% |
| VR8 | a | 16 | 1 | 2R small bottles | — | — | — | 3.08 | 100% |
| | b | 16 | 1 | 2R small bottles | 610 | 25 | 360 | 1.74 | 57% |
| VR9 | a | 8.65 | 0.9 | cartridge | — | — | — | 1.02 | 100% |
| | b | 8.65 | 0.9 | cartridge | 610 | 25 | 360 | 0.48 | 47% |
| VR10 | a | 8.65 | 0.9 | cartridge | — | — | — | 1.16 | 100% |
| | b | 8.65 | 0.9 | cartridge | 610 | 25 | 360 | 0.46 | 40% |
| VR11 | a | 8.65 | 0.9 | cartridge | — | — | — | 1.08 | 100% |
| | b | 8.65 | 0.9 | cartridge | 610 | 25 | 360 | 0.49 | 46% |
| VR12 | a | 8.68. | 0.9 | cartridge | — | — | — | 1.26 | 100% |
| | b | 8.65 | 0.9 | cartridge | 610 | 25 | 360 | 0.47 | 37% |

Table 3 shows the results of a total of twelve test rows: VR1 to VR12. Between two (a, b) and six (a to f) tests were performed respectively in each row. Originating from one reference article (always test a) tests were conducted at different treatment temperatures $T_B$ and over different treatment times $t_B$.

A glass having the following composition was used in all tests: 73.2 weight-% $SiO_2$; 10.1 weight-% $B_2O_3$; 2.9 weight-% $Na_2O$; 6.1 weight-% $K_2O$; 7.4 weight-% $ZrO_2$; 0.1 weight-% Cl and 0.1 weight-% $Al_2O_3$. The $Al_2O_3$ content stems from contaminants in the raw materials which are used in the manufacture of glass. The glass used has a glass transition temperature $T_g$=585° C. With the exception of test row VR7, all tests were performed according to ISO 4802. Test row VR7 was conducted according to USP 660 (glass grains) in order to examine if the reduction in alkali release is independent of the glass material type (grains, tube or container).

In the test rows according to ISO 4802, tubes with a total of three different tubal geometries were used. The tubes in test row VR1 had an outside diameter OD=14.25 mm and a wall thickness WT=0.95 mm. In test rows VR2 to VR4 and VR6 to VR8 tubes with OD=16 mm and WT=1 mm were used. Tests in rows VR5 and VR9 to VR12 were performed with tubes with OD=8.65 mm and WT=0.9 mm. All test rows show the efficiency of the inventive method. The method provided according to the invention can therefore be applied independent of the tubular geometry.

The same applies to the type of glass article, since tests cited in the rows in Table 3 were performed on tubes and different containers and since—as previously stated—a reduction in the alkali release occurred in all test rows based on the method provided according to the invention. On the basis of test rows VR2 to VR4, it can be observed that the alkali release decreases with increasing treatment duration $t_B$. A comparison between VR2 and VR4 moreover shows that the reduction of the alkali release is greater at a higher treatment temperature $T_B$ but same treatment time $t_B$. This applies in particular to short treatment times.

The influence of the treatment temperature $T_B$ in the inventive method is recognized also in test rows VR5 and VR7. Tests VR5c and VR7b compared to tests VR5b and VR7c achieve a lower level of alkali release in spite of a shorter treatment time $t_B$. The reason for this is the treatment temperature $T_B$ which is higher during tests VR5c and VR7b than during tests VR5b or VR7c. It must be noted here, that for tests VR7b and VR7c, initially an untreated glass tube was converted to glass grains according to USP 660 and was then subjected to the inventive thermal post-treatment and that the $Na_2O$ equivalency was determined according to USP 660 or ISO 720 respectively.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A glass article, consisting of:
a thermally treated borosilicate glass having an $Al_2O_3$ content of less than 1 weight-% and a $ZrO_2$ content of 2-12 weight-%, the glass article having an alkali release of A≤0.5 mg/l $Na_2O$ equivalency according to ISO 4802 or an alkali release A≤3 mg/l $Na_2O$ equivalency according to USP 660 (glass grains) or ISO 720 (glass grains), wherein the glass of the glass article has a glass transition temperature $T_g$, wherein the glass article is thermally treated by subjecting the glass article to a treatment temperature of $T_B$≥$T_g$+5° K over a treatment time of $t_b$≥5 min and subsequently cooling the glass article.

2. The glass article of claim 1, wherein the glass article is in the embodiment of a small glass bottle, a glass vial, an ampoule, a glass ampoule, a cylindrical ampoule, a cartridge, a syringe body, a rod, an internal constructed tubular object, an external constructed tubular object, a tube, a semi-finished product to produce one of the aforementioned articles, or glass grains produced according to USP 660.

3. The glass article of claim 1, wherein the glass article has an alkali release A that is ≥15% less compared to an untreated reference glass article of the same composition.

4. The glass article of claim 1, wherein the borosilicate glass consists of the following composition:

| | |
|---|---|
| SiO₂ | 60-78 weight -%; |
| B₂O₃ | 7-20 weight -%; |
| Li₂O | 0-2 weight -%; |
| Na₂O | 0-6.5 weight -%; |
| K₂O | 2.5-12 weight -%; |
| ZnO | 0-2 weight -%; |
| ZrO₂ | 2-12 weight -%; |
| refining agent | 0-1 weight -%; |
| Al₂O₃ | <1 weight -%; and |
| unavoidable contaminants. | |

5. The glass article of claim 1, wherein the borosilicate glass consists of the following composition:

| | |
|---|---|
| SiO₂ | 60-78 weight -%; |
| B₂O₃ | 7-20 weight -%; |
| Li₂O | 0-2 weight -%; |
| Na₂O | 0-6.5 weight -%; |
| K₂O | 2.5-12 weight -%; |
| ZnO | 0-2 weight -%; |
| ZrO₂ | 2-12 weight -%; |
| refining agent | 0-1 weight -%; |
| Al₂O₃ | <1 weight -%; |
| at least one of MgO, CaO, BaO, TiO₂, or SrO with a total of <2 weight -%; and unavoidable contaminants. | |

6. The glass article of claim 1, wherein the glass article is a storage container for pharmaceutical substances.

7. The glass article of claim 1, wherein the glass article has an alkali release A that is ≥40% less compared to an untreated reference glass article of the same composition.

8. The glass article of claim 7, wherein the glass article has an alkali release A that is ≥50% less compared to an untreated reference glass article of the same composition.

9. The glass article of claim 1, wherein the borosilicate glass comprises the following composition:

| | |
|---|---|
| SiO₂ | 60-78 weight -%; |
| B₂O₃ | 7-20 weight -%; |
| Li₂O | 0-2 weight -%; |
| Na₂O | 0-6.5 weight -%; |
| K₂O | 2.5-12 weight -%; |
| ZnO | 0-2 weight -%; |
| ZrO₂ | 2-12 weight -%; |
| refining agent | 0-1 weight -%; |
| Al₂O₃ | <1 weight -%; and |
| unavoidable contaminants. | |

10. The glass article of claim 9, wherein the glass comprises 9-20 weight-% $B_2O_3$.

11. The glass article of claim 9, wherein the glass comprises >0-6.5 weight-% $Na_2O$.

12. The glass article of claim 9, wherein the glass comprises 4-12 weight-% $K_2O$.

13. The glass article of claim 9, wherein the glass comprises 5-12 weight-% $ZrO_2$.

14. The glass article of claim 1, wherein the glass is aluminum-free.

15. The glass article of claim 1, wherein the glass has a glass transition temperature $T_g$ of $500°\,C. \leq T_g \leq 620°\,C$.

* * * * *